United States Patent Office 3,492,331
Patented Jan. 27, 1970

3,492,331
4 - NITRO - 2,6 - DICHLOROPHENYL ISOCYANATE AND PREPARATION OF ORGANIC ISOCYANATES
Adnan A. R. Sayigh, North Haven, and Henri Ulrich, North Branford, Conn., assignors to The Upjohn Company, Kalamazoo, Mich., a corporation of Delaware
No Drawing. Filed Dec. 20, 1966, Ser. No. 603,113
Int. Cl. C07c 119/04
U.S. Cl. 260—453        21 Claims

ABSTRACT OF THE DISCLOSURE

A method of increasing the yield and ease of operation in the phosgenation of a primary amine to obtain the corresponding isocyanate by the use, as catalyst, of one of the class of N-alkyl-N-(alkyl or aryl)-substituted formamides or alkanoamides, N-alkyl-lactams, N-alkyl-N-(alkyl or aryl)-N'-arylformamidines or alkanamidines, or N,N'-dialkyl-N,N'-di(alkyl or aryl)-N''-arylguanidines. Any primary amine can be converted to the corresponding isocyanate. When applied to aminocarboxylic and aminosulfonic acids the process gives the corresponding isocyanato-carboxylic acid chlorides and isocyanato-sulfonyl chlorides.

BACKGROUND OF THE INVENTION

Field of the invention

This invention relates to an improved process for the preparation of isocyanates from the corresponding primary amines and is more particularly concerned with the use of certain fully N-substituted amides, amidines and guanidines as catalysts in the phosgenation of primary amines to yield the corresponding isocyanates, and with certain novel isocyanates so prepared.

Description of the prior art

The conversion of primary amines to the corresponding isocyanates by phosgenation is well-known in the art; see, for example, the review of more important methods given by Saunders et al., Polyurethanes, Chemistry and Technology, vol. I, pages 18 to 22, inclusive, Interscience Publishers, New York 1962. In general the art methods comprise the reaction of phosgene with the free primary amine, in the case of aromatic amines, or the amine hydrochloride, in the case of aliphatic amines, generally in the presence of an inert solvent such as chlorobenzene, o-dichlorobenzene, and the like, and optionally in the presence of a catalyst such as tetramethylurea (U.S. Patent 2,689,861) or a tertiary amine (U.S. Patent 2,362,648). If desired the phosgenation can be carried out in two stages the first stage being conducted at a lower temperature than the second stage; the temperature employed in the second stage is sufficient to accomplish rearrangement of the carbamoyl chloride formed as intermediate in the first stage. In general the methods hitherto known give reasonably satisfactory yields in the case of the more commonly used unsubstituted aliphatic and aromatic mono- and poly-amines. However, the conversion of primary amines which contain substituents such as COOH, SO₃H, and the like or in which the amino group is hindered, for example, by close proximity to one or more alkyl, alkoxy and the like groups in an aromatic ring, is more difficult to accomplish and requires the use of more rigorous reaction conditions with increased usage of phosgene and formation of undesirable by-products.

SUMMARY OF THE INVENTION

We have now found that, by use of certain catalysts defined below, there is provided a method of phosgenation which is of broad general applicability to the conversion of all types of primary amine to the corresponding isocyanate. The process of the invention enables the amount of phosgene used in prior art processes to be reduced substantially. Further, using the process of the invention it is possible to prepare readily and in good yield certain types of isocyanate which were difficult to prepare economically by prior methods as well as certain types of isocyanate which were not known hitherto.

The process of the invention consists, in its broadest aspect, of an improved process for the conversion of a primary amine to the corresponding isocyanate by reaction with phosgene wherein the improvement comprises carrying out the phosgenation in the presence of a catalytic amount of a compound selected from the class consisting of compounds having the formulae:

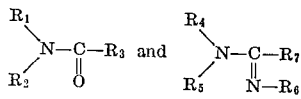

wherein $R_1$ taken alone represents lower-alkyl, $R_2$ is selected from the class consisting of lower-alkyl and aryl, $R_3$ taken alone is selected from the class consisting of hydrogen and lower-alkyl, $R_1$ taken together with $R_2$ and the attached N atom represents the residue of a saturated heterocyclic secondary amine having from 4 to 6 carbon atoms in the ring thereof, $R_1$ taken together with $R_3$ and the N and C atoms, respectively, to which they are bonded, represents the residue of a lactam having from 4 to 6 atoms in the ring, $R_4$ represents lower-alkyl, $R_5$ is selected from the class consisting of lower-alkyl and aryl, $R_4$ and $R_5$ taken together with the N atom to which they are attached represent the residue of a saturated heterocyclic secondary amine having from 4 to 6 carbon atoms, inclusive, in the ring thereof, $R_6$ represents aryl, and $R_7$ is selected from the class consisting of hydrogen and

wherein $R_4$ and $R_5$ are as hereinbefore defined.

The term "lower-alkyl" as used throughout the specification means alkyl from 1 to 8 carbon atoms, inclusive, such as methyl, ethyl, propyl, butyl, pentyl, hexyl, heptyl, octyl, and isomeric forms thereof. The term "aryl" as used throughout the specification means the residue of an aromatic hydrocarbon from which one hydrogen atom has been removed; examples of aryl are phenyl, tolyl, xylyl, naphthyl, biphenylyl, and the like. The term "residue of a lactam having from 4 to 6 carbon atoms in the ring" is inclusive of α-pyrrolidono, alkyl-substituted-α-pyrrolidono such as 3-methyl-α-pyrrolidono, 4-methyl-α-pyrrolidono, and the like, α-piperidono, alkyl-substituted-α-piperidono such as 3-methyl-α-piperidono, 4-ethyl-α-piperidono, and the like, and homo-α piperidono. The term "residue of a saturated heterocyclic secondary amine having from 4 to 6 carbon atoms, inclusive, in the ring thereof" is inclusive of pyrrolidino,, alkylpyrrolidino such as 2-methyl-pyrrolidino, 2,2-dimethylpyrolidino, and the like, piperazino, alkylpiperazino such as 4-methylpiperazino, 2,4-dimethylpiperazino, and the like, morpholino, piperidino, alkylpiperidino such as 2-methylpiperidino, 3-methylpiperidino, and the like, hexamethyleneimino, homopiperazino, homomorpholino, and the like.

In carrying out the process of the invention the procedures routinely employed in the art are used, the novel feature being the incorporation of catalyst of Formula I or II above. As is well-known the most suitable procedure to employ with any particular amine depends upon the nature of the amine in question. For example, in the case of aromatic primary amines the phosgenation is accomplished in accordance with conventional procedures advantageously by initially treating a solution or suspension of free amine in an inert organic solvent with phosgene at a temperature of about 0° C. to about 30° C. and subsequently raising the temperature of the reaction mixture to a value within the range of about 80° C. to about 180° C. and preferably within the range of about 100° C. to about 150° C. Additional phosgene is generally added during the second stage. Illustrative of the inert organic solvents which can be employed in the above phosgenation are chlorobenzene, o-dichlorobenzene, toluene, xylene, and the like.

In carrying out the phosgenation of primary aromatic amines in accordance with the present invention the above procedure is employed with the additional and novel feature that a catalyst having the Formula I or II is incorporated into the reaction mixture. If desired the catalyst can be added in a single batch or, preferably, can be added in increments over any given portion, or the whole, of the period of reaction. The amount of said catalyst employed can vary over wide limits depending upon the particular combination of catalyst and primary amine employed. Advantageously the amount of catalyst employed is within the range of about 0.1 to about 10% by weight, based on primary amine. Amounts of catalyst in excess of 10% by weight based on amine can be employed if desired but offer little advantage in performance (on a time-yield basis) over amounts within the above range. The practical upper limit is dictated largely by economic factors as will be obvious to one skilled in the art. The preferred amount of catalyst employed is within the range of about 1% to about 3% by weight based on primary amine.

It is found that, when phosgenating aromatic primary amines in accordance with the process of the invention as described above, the amount of phosgene employed can be substantially reduced in comparison with the amounts conventionally used. In most cases the amount of phosgene required when using the process of the invention is of the order of stoichiometric proportion i.e. 1 molar proportion of phosgene per amino group in the amine. Generally the phosgene is added continuously or semicontinuously in gaseous form throughout the reaction.

The aromatic primary amines which can be phosgenated in accordance with the process of the invention include unsubstituted primary aromatic mono- and poly-amines such as aniline, o-, m-, and p-phenylenediamine, 4,4'-diaminobiphenyl, α-naphthylamine, β-naphthylamine, 1,5-diaminonaphthalene, benzidine, 4,4' - methylenebis(aniline),4,4',4''-methylidyne tris(aniline), and the like, and primary aromatic mono- and polyamines which are substituted by one or more substituents which latter are either inert under the conditions of the reaction (i.e. do not enter into reaction with any of the reactants or in any way interfere with the course of the reaction) or themselves are converted by reaction with phosgene without otherwise interfering with the course of the reaction. Examples of such substituents are alkyl, preferably loweralkyl as hereinbefore defined; alkoxy such as methoxy, ethoxy, propoxy, butoxy, pentyloxy, hexyloxy, heptyloxy, and octyloxy including isomeric forms thereof; alkenyloxy such as allyloxy, butenyloxy, pentenyloxy, hexenyloxy, heptenyloxy, and octenyloxy including isomeric forms thereof; alkylthio such as methylmercapto, ethylmercapto, propylmercapto, butylmercapto, pentylmercapto, hexylmercapto, heptylmercapto, and octylmercapto including isomeric forms thereof; halo i.e. fluoro, chloro, bromo, iodo; nitro; cyano; thiocyano; carbalkoxy such as carbomethoxy, carbethoxy, carbopropoxy, cahbobutoxy, carbopentoxy, carbohexoxy, and the like; carboxy (which is converted to COCl during the phosgenation) and sulphonic acid $SO_3H$ (which is converted to $SO_2Cl$ during the phosgenation).

Examples of primary aromatic amines carrying one or more substituents as defined above, which can be converted to the corresponding isocyanates in accordance with the process of the invention are: p-chloroaniline, p-nitroaniline, 2,4-dichloroaniline, 2,6-dichloro-4-nitroaniline, p-anisidine, p-allyloxyaniline, p-methylmercaptoaniline, p-aminobenzoic acid (converted to p-isocyanatobenzoylchloride in the process of the invention), p-amino-benzene sulfonic acid (converted to p-isocyanatobenzenesulfonyl chloride), 3,3' - dichlorobenzidine, 3,3' - dimethoxybenzidine, 3,3'-dimethyl-4,4'-methylene-bis(aniline), 5-nitro-1-aminonaphthalene, 8-cyano-1,5 - diaminonaphthalene, 6-ethoxy-1,5-diaminonaphthalene, ethyl p-aminobenzoate, methyl m-aminobenzoate, propyl anthranilate. m-cyanoaniline, and the like.

In the phosgenation of aliphatic, araliphatic, and cycloaliphatic primary mono- and polyamines in accordance with methods currently employed in the art, the amine is usually first converted to the corresponding hydrochloride. Advantageously this is accomplished by treatment of the amine, conventionally in solution in an inert organic solvent, with anhydrous hydrogen chloride. Alternatively the amine hydrochloride can be prepared by dissolution of the amine in aqueous hydrochloric acid followed by evaporation to dryness and suspension of the resulting hydrochloride in inert solvent. The suspension of amine hydrochloride in solvent is then treated with phosgene, either in the two stages with temperature differential as in the case of aromatic isocyanates described above, or in a single stage at a temperature of about 80° C. to about 180° C.

When phosgenating aliphatic, araliphatic and cycloaliphatic primary mono- and polyamines in accordance with the process of the invention, the above prior art procedures are used with the additional and novel feature that a catalyst having the Formula I or II is incorporated into the reaction mixture. The amount of catalyst and the manner in which it is added are in accordance with the same limits and procedure discussed above in describing the phosgenation of aromatic amines in accordance with the invention.

As in the case of the phosgenating of aromatic amines, the phosgenation of aliphatic, araliphatic and cycloaliphatic amines in accordance with the process of the invention results in considerable savings in usage of phosgene. In general aliphatic amines are more difficult to phosgenate than aromatic amines, requiring longer reaction times and greater amounts of phosgene. However, using the process of the invention, it is possible to obtain good yields in the conversion of aliphatic, araliphatic, and cycloaliphatic amines to corresponding isocyanates using shorter reaction times and significantly smaller amounts of phosgene than hitherto necessary.

Examples of aliphatic, araliphatic and cycloaliphatic mono and polyamines which can be converted to the corresponding isocyanates in accordance with the process of the invention are: methylamine, ethylamine, isobutylamine, hexylamine, octylamine, hexamethylenediamine, pentamethylenediamine, allylamine, butenylamine, pentenylamine, octenylamine, cyclohexylamine, cyclopentylamine, cyclooctylamine, benzylamine, benzhydrylamine, phenethylamine, ω,ω'-xylylenediamine, 1,4,-bis-(2-aminoethyl)benzene and the like. The aliphatic, araliphatic and cycloaliphatic mono- and polyamines employed in the process of the invention also include those having one or more substituents, as defined above, which are inert under the conditions of phosgenation or which are converted to other groups by said phosgenation without otherwise interferring with the course of the reaction.

The compounds of Formula I above which are employed in the process of the invention are inclusive of N-alkyl-N-(alkyl or aryl) substituted formamides and alkanomides as well as N-alkyl-lactams. Representative of compounds falling within the Formula I are dimethylformamide, diethylformamide, N-methyl-N-isopropylformamide, N,N-dihexylformamide, N,N-dimethylacetamide, N-ethyl-N-isopropylbutyramide, N,N-dimethylhexanoamide, N-formylpyrrolidine, N-formylhexamethyleneimine, N-acetylpyrrolidine, N-butyrylpyrrolidine, N-hexanoylpyrrolidine, N-methylformanilide, N-methylacetanilide, N-ethylacetanilide, N-methylbutyrolactam, N-butylbutyrolactam, N-methyl-ε-caprolactam, and the like.

The compounds of Formula II above which are employed in the process of the invention are inclusive of N-alkyl-N-(alkyl or aryl)-N'-aryl-formamidines and alkanamidines, and of N,N'-dialkyl-N,N'-di(alkyl or aryl)-N''-arylguanidines. Representative of compounds falling within the Formula II are N,N,N',N'-tetramethyl-N''-phenylguanidine, N,N-dimethyl-N',N'-diethyl-N''-phenylguanidine, N,N'-dimethyl-N,N'-diethyl-N''-phenylguanidine, N,N,N',N'-tetramethyl-N''-p-tolyguanidine, N,N'-dimethyl - N,N' - diphenyl - N'' - p - tolylguanidine, N,N-dimethyl - N' - phenylformamidine, N,N-diethyl-N'-phenylformamidine, N,N'-dihexyl-N'-o-tolylformamidine, N,N-dimethyl-N'-p-xylylacetamidine, and the like.

The above compounds of Formula I or II are for the most part well-known in the art and can be prepared by conventional procedures which will be obvious to those skilled in the art.

While the process of the invention is applicable to the phosgenation of any primary amine to the corresponding isocyanate it is particularly applicable to the facile conversion of aminohydrocarbylcarboxylic and aminohydrocarbylsulfonic acids to the corresponding isocyanatocarboxylic acid chlorides and isocyanatosulfonyl chloride. The hydrocarbyl residue in said starting amino acids is that of an aromatic or aliphatic hydrocarbon such as those corresponding to the aryl, aliphatic, and araliphatic moieties hereinbefore defined. The conversions of the said amino acids have hitherto been accomplished only with considerable difficulty involving prolonged reaction times and large excesses of phosgene; see, for example, Iwakura et al., J. Org. Chem. 30, 1158, 1965 and 31, 142, 1966, British Patents 646,033 and 748,166 and German Patents 947,159 and 1,147,483. It has now been found that said conversions can be accomplished very readily without the use of excessive reaction times or amounts of phosgene by employing the process of the invention as hereinbefore defined. Illustratively sulfanilic acid and p-aminobenzoic acid are converted, using the process of the invention, rapidly and in good yield to p-isocyanatobenzenesulfonyl chloride and p-isocyanatobenzoyl chloride, respectively, using substantially stoichiometric proportions of phosgene and amine. In contrast, phosgenation of said sulfanilic and p-aminobenzoic acids in the absence of a catalyst of the Formulae I and II gives low yields of the desired isocyanato acid chlorides even when a large excess of phosgene and prolonged reaction times are employed.

The mono and polyisocyantes which can be prepared by the process of the invention are, for the most part, known compounds which can be employed as intermediates in a variety of reactions well-known in the art. For example, the monoisocyanates are useful in the conversion of hydrocarbylsulfonamides to the corresponding hydrocarbylsulfonyl isocyanates; illustratively the monoisocyanate is reacted with the appropriate hydrocarbylsulfonamide under conditions known in the art for the preparation of sulfonyl ureas (see, for example, Petersen, Berichte, 83, 551, 1950), to form the corresponding hydrocarbylsulfonyl urea and the latter is then reacted with phosgene to give a mixture of the appropriate hydrocarbylsulfonyl isocyanate and the original aliphatic isocyanate. The hydrocarbylsulfonyl isocyanates so obtained are useful as stabilizers. For example, they can be used to stabilize organic isocyanates against discoloration and decomposition on storage. The polyisocyanates produced in accordance with the process of the invention are useful in the synthesis, by reaction with suitable polyols, of polyurethanes using procedures well-known in the art; see, for example, Saunders et al., ibid, Part II, 1964.

The following examples illustrate the best mode contemplated by the inventors for carrying out their invention but are not to be construed as limiting the scope thereof.

EXAMPLE 1

To a suspension of 4.9 g. (0.038 mole) of aniline hydrochloride in 70 ml. of benzene was added 0.245 g. (5% by weight based on aniline hydrochloride) of N,N,N',N'-tetramethyl-N''-phenylguanidine and the mixture was heated to reflux. Phosgene was passed into the refluxing mixture at a rate of 1 g. per minute for 35 minutes. The mixture was then maintained at reflux and purged with nitrogen for 15 minutes. The purged mixture was cooled to 20° C. No unreacted aniline hydrochloride remained in suspension. The benzene solvent was removed by distillation, the last traces being removed under reduced pressure. The residue was dissolved in ligroin and treated with 3.55 g. of aniline to convert the phenyl isocyanate present in the reaction product to N,N'-diphenylurea. The latter separated as a solid which was isolated by filtration to obtain 5.95 g. of N,N'-diphenylurea having a melting point of 247–249° C. Isolation of the latter indicated the presence of 3.34 g. (74% theoretical yield) of phenyl isocyanate in the reaction product.

The above experiment was repeated precisely as described with the exception that no N,N,N',N'-tetramethyl-N''-phenylguanidine was employed as catalyst. At the end of the phosgenation followed by the purging step, 3.36 g. of unchanged aniline hydrochloride (74.2% recovery) was isolated by filtration. Reaction of the remaining reaction product with aniline as described above yielded only 0.99 g. of N,N'-diphenylurea corresponding to the formation of 0.58 g. (12.3%) of phenyl isocyanate. An additional amount of 0.44 g. of phenylcarbamoyl chloride was isolated on addition of the ligroin. Thus, the total yield of phenyl isocyanate corresponded to 19.76%.

The above experiments clearly indicate the excellent results, obtained using N,N,N',N'-tetramethyl-N''-phenylguanidine as catalyst in accordance with the process of the invention.

EXAMPLE 2

A suspension of 259.58 g. (1.5 moles) of sulfanilic acid in 900 ml. of o-dichlorobenzene was maintained at 165° C. and stirred while phosgene was passed into the suspension at a rate of 1 g./minute and a solution of 13 g. of dimethylformamide in 100 ml. o-dichlorobenzene was added slowly at such a rate that the total time for the addition was 240 minutes. After the addition of catalyst was complete the phosgene addition was maintained at the same rate for a further 75 minutes (total amount of phosgene added=315 g. or 3.15 moles) at which time a clear solution was obtained. The resulting mixture was purged with nitrogen for 90 minutes while maintaining the mixture at 165° C. At the end of this time the o-dichlorobenzene solvent was removed by distillation under reduced pressure. Distillation of the residue under vacuum gave 247.5 g. (76% theoretical yield) of p-isocyanatobenzenesulfonyl chloride as a solid having a melting point of 50 to 52° C. and a boiling point of 115 to 120° C. at a pressure of 0.5 to 0.7 mm. of mercury.

EXAMPLE 3

To a mixture of 27.4 g. (0.2 moles) of p-aminobenzoic acid in 200 ml. of o-dichlorobenzene maintained at 150° to 168° C was added phosgene at a rate of 2 g. per minute and a solution of 1.4 g. of dimethylformamide in 50 ml. of o-dichlorobenzene at such a rate that all the solution had been added after 45 minutes. The addition of phosgene was continued for a further 75 minutes after catalyst addition was complete. The resulting solution was then maintained at about 150° C. and purged with nitrogen for 30 minutes. The purged solution was then distilled under reduced pressure to remove o-dichlorobenzene and the residue was distilled in vacuo to obtain 19.5 g. (54% theoretical yield) of p-isocyanatobenzoyl chloride having a boiling point of 69° C. at 0.2 mm. of mercury which solidified on standing to a solid having a melting point of 32–34° C.

The above procedure was repeated but omitting the dimethylformamide catalyst; no significant amount of p-isocyanatobenzoyl chloride was obtained. The major reaction product, after phosgenation at 160–170° C. for 11.5 hrs. using a 2 g. per minute addition of phosgene, was 22 g. of an unidentified solid having a melting point higher than 290° C.

EXAMPLE 4

A solution of 103.5 g. (0.5 mole) of 4-nitro-2,6-dichloroaniline in 1000 ml. of o-dichlorobenzene was heated under reflux while phosgene was added at a rate of 1 g. per minute and a total of 10 g. of N,N,N',N'-tetramethyl-N"-phenylguanidine was added in 5 equal parts over a period of 435 minutes. At the end of this time the mixture was purged with nitrogen for 60 minutes at reflux before distilling the o-dichlorobenzene solvent under reduced pressure. The residue was distilled in vacuo to yield 88 g. (75.5% theoretical yield) of 4-nitro-2,6-dichlorophenyl isocyanate having a boiling point of 114 to 115° C. at a pressure of 0.2 mm. of mercury and a melting point of 76 to 82° C.

The 4-nitro-2,6-dichlorophenyl isocyanate so obtained is useful as a catalyst in the conversion of hydrocarbylsulfonamides to the corresponding hydrocarbylsulfonyl isocyanates as discussed above, which latter are stabilizers for hydrocarbylsulfonyl isocyanates in the manner described above, and as an intermediate in the preparation of flame retardant polyurethanes. For the latter purpose, the above isocyanate is used as a part of (up to 10% by weight) of the polyisocyanate component normally employed in making polyurethanes according to procedures well-known in the art for the preparation of both cellular and non-cellular polyurethanes; see, Saunders et al., supra.

In contrast to the above facile preparation of 4-nitro-2,6-dichlorophenyl isocyanate an attempt was made to phosgenate the 4-nitro-2,6-dichloroaniline in the absence of a catalyst. A solution of 60.35 g. (0.05 mole) of 4-nitro-2,6-dichloroaniline in 100 ml. of dichlorobenzene was heated under reflux and treated with phosgene (total of 420 g.) over a period of 420 minutes. After purging the resulting mixture with nitrogen the solution was cooled and the solid which separated was isolated by filtration. There was thus obtained 7.7 g. (74% recovery) of unreacted 4-nitro-2,6-dichloroaniline having a melting point of 196 to 198° C. Infrared spectroscopic analysis of the residual solution indicated only a trace of isocyanate as shown by the characteristic NCO band at 4.4μ.

EXAMPLE 5

Using the procedure described in Example 1, but replacing aniline hydrochloride by the hydrochlorides of p-chloroaniline, p - nitroaniline, 2,4 - dichloroaniline, p-anisidine, p - allyloxyaniline, p - methylmercaptoaniline, 3,3' - dichlorobenzidine, 3,3' - dimethoxybenzidine, 3,3'-dimethyl-4,4'-methylenebis(aniline), 5 - nitro - 1 - aminonaphthalene, 8 - cyano - 1,5 - diaminonaphthalene, 6-ethoxy - 1,5 - diaminonaphthalene, ethyl p - aminobenzoate, methyl m - aminobenzoate, or m - cyanoaniline there are obtained p - chlorophenyl isocyanate, p - nitrophenyl isocyanate, 2,4 - dichlorophenyl isocyanate, p-methoxyphenyl isocyanate, p - allyloxyphenyl isocyanate, p - methylmercaptophenyl isocyanate, 3,3' - dichloro-4,4' - diisocyanatodiphenyl, 3,3' - dimethoxy - 4,4' - diisocyanatodiphenyl, 3,3' - dimethyl - 4,4' - methylenebis-(phenyl isocyanate), 5 - nitro - 1 - isocyanatonaphthalene, 8 - cyano - 1,5 - diisocyanatonaphthalene, 6 - ethoxy-1,5-diisocyanatonaphthalene, ethyl p - isocyanatobenzoate, methyl m - isocyanatobenzoate, and m - cyanophenyl isocyanate, respectively.

EXAMPLE 6

Using the procedure described in Example 3, but replacing p - aminobenzoic acid by m - aminobenzoic acid there is obtained m-isocyanatobenzoyl chloride.

Similarly, using the procedure described in Example 3, but replacing p-aminobenzoic acid by the known 3-amino-2 - propoxybenzoic, 4 - amino - 2 - propoxybenzoic, 2-allyloxy - 4 - aminobenzoic, 4 - amino - 2 - bromobenzoic, 5 - amino - 2 - chlorobenzoic, 3 - amino - 2,5 - dichlorobenzoic, 3 - amino - 2,6 - dimethylbenzoic, 3 - amino - 4-ethoxybenzoic, 4 - amino - 2 - ethylthiobenzoic, 4 - amino-2 - isobutoxybenzoic, 4 - amino - 3 - nitrobenzoic, 3-amino - 4 - isopropenylbenzoic, 2 - amino - 5 - thiocyanobenzoic, 2-amino - 5 - cyanobenzoic, or 3 - carbomethoxy-2 - aminobenzoic acids (the latter prepared by reduction of 2 - nitroisophthalic acid 1 - methylester), there are obtained 3 - isocyanato - 2 - propoxybenzoyl, 4 - isocyanato - 2 - propoxybenzoyl, 2 - allyloxy - 4 - isocyanatobenzoyl, 2 - bromo - 4 - isocyanatobenzoyl, 2 - chloro-5 - isocyanatobenzoyl, 2,5 - dichloro - 3 - isocyanatobenzoyl, 2,6-dimethyl - 3 - isocyanatobenzoyl, 4 - ethoxy-3-isocyanatobenzoyl, 2 - ethylthio - 4 - isocyanatobenzoyl, 2 - isobutoxy - 4 - isocyanatobenzoyl, 4 - isocyanato - 3-nitrobenzoyl, 3 - isocyanato - 4 - isopropenylbenzoyl, 2-isocyanato - 5 - thiocyanobenzoyl, 5 - cyano - 2 - isocyanatobenzoyl and 3 - carbomethoxy - 2 - isocyanatobenzoyl chlorides, respectively.

EXAMPLE 7

Using the procedure described in Example 3 but replacing dimethylformamide by N,N,N',N' - tetramethyl-N" - phenylquanidine, N - methyl - N - isopropylformamide, diethylformamide, N,N - dihexylformamide, N,N - dimethylacetamide, N - formylpyrrolidine, N-formylhexamethyleneimine, N - acetylpyrrolidine, N-methylformanilide, N - methylbutyrolactam, N - methyl-ε - caprolactam, N,N - dimethyl - N' - phenylformamidine, or N,N- dimethyl - N' - phenylacetamidine, there is obtained p-isocyanatobenzoyl chloride in comparable yield.

We claim:
1. 4-nitro-2,6-dichlorophenyl isocyanate.
2. In a process for the conversion of an organic primary amine to the corresponding isocyanate by reaction with phosgene the improvement which comprises carrying out the phosgenation in the presence of a catalytic amount of a compound selected from the class consisting of compounds having the formulae:

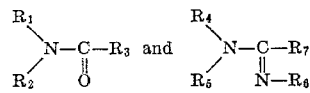

wherein $R_1$ taken alone represents lower-alkyl, $R_2$ is selected from the class consisting of lower-alkyl and aryl, $R_3$ taken alone is selected from the class consisting of hydrogen and lower-alkyl, $R_1$ taken together with $R_2$ and the attached N atom represents a saturated heterocyclic secondary amine having from 4 to 6 carbon atoms in the ring thereof, $R_1$ taken together with $R_3$ and the N and C atoms, respectively, to which they are bonded, represents a lactam having from 4 to 6 carbon atoms in the ring, $R_4$ represents lower alkyl, $R_5$ is selected from the class consisting of lower-alkyl and aryl, $R_4$ and $R_5$ taken together with the N atom to which they are attached represent a saturated heterocyclic secondary amine having from 4 to 6 carbon atoms, inclusive, in the ring thereof, $R_6$ represents aryl, and $R_7$ is selected from the class consisting of hydrogen, and

wherein $R_4$ and $R_5$ are as hereinbefore defined.
3. The process of claim 1 wherein the catalyst is an N,N-di(lower-alkyl)-formamide.

4. The process of claim 1 wherein the catalyst is N,N-dimethylformamide.

5. The process of claim 1 wherein the catalyst is an N-lower-alkyllactam.

6. The process of claim 1 wherein the catalyst is an N,N,N',N'-tetra(lower-alkyl)-N''-arylguanidine.

7. The process of claim 1 wherein the catalyst is N,N,N',N'-tetramethyl-N''-phenylguanidine.

8. In a process for the conversion of an aromatic primary amine to the corresponding isocyanate by reaction with phosgene the improvement which comprises carrying out the phosgenation in the presence of a catalytic amount of a compound selected from the class consisting of compounds having the formulae:

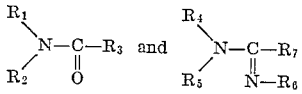

wherein $R_1$ taken alone represents lower-alkyl, $R_2$ is selected from the class consisting of lower-alkyl and aryl, $R_3$ taken alone is selected from the class consisting of hydrogen and lower-alkyl, $R_1$ taken together with $R_2$ and the attached N atom represents a saturated heterocyclic secondary amine having from 4 to 6 carbon atoms in the ring thereof, $R_1$ taken together with $R_3$ and the N and C atoms, respectively, to which they are bonded, represents a lactam having from 4 to 6 carbon atoms in the ring, $R_4$ represents lower alkyl, $R_5$ is selected from the class consisting of lower-alkyl and aryl, $R_4$ and $R_5$ taken together with the N atom to which they are attached represent a saturated heterocyclic secondary amine having from 4 to 6 carbon atoms, inclusive, in the ring thereof, $R_6$ represents aryl, and $R_7$ is selected from the class consisting of hydrogen and

wherein $R_4$ and $R_5$ are as hereinbefore defined.

9. The process of claim 8 wherein the catalyst is an N,N-di(lower-alkyl)formamide.

10. The process of claim 8 wherein the catalyst is N,N-dimethylformamide.

11. The process of claim 8 wherein the catalyst is an N-(lower-alkyl)lactam.

12. The process of claim 8 wherein the catalyst is an N,N,N',N'-tetra(lower-alkyl)-N''-arylguanidine.

13. The process of claim 8 wherein the catalyst is N,N,N',N'-tetramethyl-N''-phenylguanidine.

14. A process for the conversion of an amino acid selected from the class consisting of aromatic aminocarboxylic acids and aromatic aminosulfonic acids to the corresponding isocyanato acid chlorides which comprises reacting said amino acid with phosgene in the presence of a catalytic amount of a compound selected from the class consisting of compounds having the formulae:

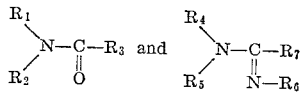

wherein $R_1$ taken alone represents lower-alkyl, $R_2$ is selected from the class consisting of lower-alkyl and aryl, $R_3$ taken alone is selected from the class consisting of hydrogen and lower-alkyl, $R_1$ taken together with $R_2$ and the attached N atom represents a saturated heterocyclic secondary amine having from 4 to 6 carbon atoms in the ring thereof, $R_1$ taken together with $R_3$ and the N and C atoms, respectively, to which they are bonded, represents a lactam having from 4 to 6 carbon atoms in the ring, $R_4$ represents lower alkyl, $R_5$ is selected from the class consisting of lower-alkyl and aryl, $R_4$ and $R_5$ taken together with the N atom to which they are attached represent a saturated heterocyclic secondary amine having from 4 to 6 carbon atoms, inclusive, in the ring thereof, $R_6$ represents aryl, and $R_7$ is selected from the class consisting of hydrogen and

wherein $R_4$ and $R_5$ are as hereinbefore defined.

15. The process of claim 14 wherein the catalyst is an N,N-di(lower-alkyl)formamide.

16. The process of claim 14 wherein the catalyst is N,N-dimethylformamide.

17. The process of claim 14 wherein the catalyst is an N-(lower-alkyl)lactam.

18. The process of claim 14 wherein the catalyst is an N,N,N',N'-tetra(lower-alkyl)-N''-arylguanidine.

19. The process of claim 14 wherein the catalyst is N,N,N',N'-tetramethyl-N''-phenylguanidine.

20. A process which comprises reacting p-aminobenzoic acid with phosgene in the presence of a catalytic quantity of N,N,N',N'-tetramethyl-N''-phenylguanidine to obtain p-isocyanatobenzoyl chloride.

21. A process which comprises reacting sulfanilic acid with phosgene in the presence of a catalytic quantity of N,N,N',N'-tetramethyl-N''-phenylguanidine to obtain p-isocyanatobenzenesulfonyl chloride.

References Cited

UNITED STATES PATENTS

| | | | |
|---|---|---|---|
| 2,362,648 | 11/1944 | Lichty et al. | 260—453 |
| 2,689,861 | 9/1954 | Thompson | 260—453 |
| 3,133,079 | 5/1964 | Luckenbaugh | 260—453 XR |

FOREIGN PATENTS 17,565   8/1965   Japan.

OTHER REFERENCES

Wilson, Jr., et al: J. Amer. Chem. Soc., vol. 76, p. 4611 (1954).

CHARLES B. PARKER, Primary Examiner

D. H. TORRENCE, Assistant Examiner

U.S. Cl. X.R.

260—2.5, 77.5, 239, 239.3, 247.7, 268, 294.7, 326.5, 247.5, 293, 391, 454, 465, 471, 482, 508, 513, 518, 561, 562, 563, 564, 565, 570, 578, 571, 575, 583, 570.9, 570.8, 553, 556, 545